US009363670B2

(12) United States Patent
Dougherty et al.

(10) Patent No.: US 9,363,670 B2
(45) Date of Patent: Jun. 7, 2016

(54) SYSTEMS AND METHODS FOR RESTRICTING ACCESS TO NETWORK RESOURCES VIA IN-LOCATION ACCESS POINT PROTOCOL

(71) Applicant: Optio Labs, LLC, Boston, MA (US)

(72) Inventors: Brian Dougherty, Nashville, TN (US); Thomas Charles Clancy, III, Washington, DC (US); Christopher Jules White, Blacksburg, VA (US); David Alexander Hamrick, Nashville, TN (US); Grayson Gates Sharpe, Nashville, TN (US); Robert Austin Hanlin, Nashville, TN (US); Krzysztof Kamil Zienkiewicz, Nashville, TN (US); Christopher Michael Thompson, Nashville, TN (US)

(73) Assignee: OPTIO LABS, INC., Boston, MA (US)

( * ) Notice: Subject to any disclaimer, the term of this patent is extended or adjusted under 35 U.S.C. 154(b) by 5 days.

(21) Appl. No.: 14/010,835

(22) Filed: Aug. 27, 2013

(65) Prior Publication Data

US 2014/0059347 A1    Feb. 27, 2014

Related U.S. Application Data

(60) Provisional application No. 61/693,427, filed on Aug. 27, 2012, provisional application No. 61/785,109, filed on Mar. 14, 2013.

(51) Int. Cl.
*H04L 9/32* (2006.01)
*H04W 12/06* (2009.01)
*H04W 12/02* (2009.01)
*H04L 29/06* (2006.01)

(52) U.S. Cl.
CPC .............. *H04W 12/06* (2013.01); *H04W 12/02* (2013.01); *H04L 63/0846* (2013.01)

(58) Field of Classification Search
CPC ... H04W 12/06; H04W 12/02; H04L 63/0846
USPC ........................................ 713/168; 380/270
See application file for complete search history.

(56) References Cited

U.S. PATENT DOCUMENTS

| 7,207,041 | B2 | 4/2007 | Elson et al. |
| 7,461,144 | B1 | 12/2008 | Beloussov et al. |
| 8,099,596 | B1 | 1/2012 | Rusakov et al. |
| 8,387,048 | B1 | 2/2013 | Grechishkin et al. |
| 8,516,095 | B2 | 8/2013 | Eisener et al. |
| 8,595,832 | B1 | 11/2013 | Yee et al. |
| 8,613,052 | B2 * | 12/2013 | Weiss .............................. 726/4 |

(Continued)

OTHER PUBLICATIONS

Extended European Search Report issued by the European Patent Office for European Patent Application No. 13733798.6, dated May 6, 2015, 6 pages.

(Continued)

*Primary Examiner* — Samson Lemma
(74) *Attorney, Agent, or Firm* — Wilmer Cutler Pickering Hale and Dorr LLP (57) ABSTRACT

Methods and systems described herein relate to enhancing security on a mobile device. Systems and methods for mobile device security include restricting access to network resources via an in-location access point device, based on whether the mobile device is in proximity of the in-location access point device.

17 Claims, 3 Drawing Sheets

(56) References Cited

U.S. PATENT DOCUMENTS

| | | |
|---|---|---|
| 2002/0052965 A1 | 5/2002 | Dowling |
| 2003/0115291 A1 | 6/2003 | Kendall et al. |
| 2003/0149874 A1 | 8/2003 | Balfanz et al. |
| 2004/0199763 A1 | 10/2004 | Freund |
| 2005/0071643 A1 | 3/2005 | Moghe |
| 2005/0136845 A1 | 6/2005 | Masuoka et al. |
| 2005/0138416 A1 | 6/2005 | Qian et al. |
| 2005/0240396 A1 | 10/2005 | Childs et al. |
| 2005/0240985 A1 | 10/2005 | Alkove et al. |
| 2006/0092037 A1 | 5/2006 | Neogi et al. |
| 2007/0186274 A1 | 8/2007 | Thrysoe et al. |
| 2008/0115011 A1 | 5/2008 | Codrescu et al. |
| 2008/0126800 A1 | 5/2008 | Guo et al. |
| 2008/0235587 A1 | 9/2008 | Heie et al. |
| 2008/0278408 A1 | 11/2008 | Strickland et al. |
| 2009/0030974 A1 | 1/2009 | Boudreau et al. |
| 2009/0138547 A1 | 5/2009 | Boudreau |
| 2009/0204815 A1* | 8/2009 | Dennis et al. .................. 713/168 |
| 2009/0282477 A1 | 11/2009 | Chen et al. |
| 2010/0023582 A1 | 1/2010 | Pedersen et al. |
| 2010/0031325 A1 | 2/2010 | Maigne et al. |
| 2010/0121567 A1 | 5/2010 | Mendelson |
| 2010/0121597 A1 | 5/2010 | Steffens et al. |
| 2011/0151955 A1 | 6/2011 | Nave |
| 2012/0116602 A1 | 5/2012 | Vaswani et al. |
| 2012/0191677 A1 | 7/2012 | Lim |
| 2012/0197988 A1 | 8/2012 | Leppanen et al. |
| 2012/0215637 A1 | 8/2012 | Hermann |
| 2012/0255014 A1 | 10/2012 | Sallam |
| 2012/0258730 A1 | 10/2012 | Tinnakornsrisuphap et al. |
| 2013/0007873 A1 | 1/2013 | Prakash et al. |
| 2013/0054812 A1 | 2/2013 | DeCoteau |
| 2013/0067488 A1 | 3/2013 | Kumar et al. |
| 2013/0111039 A1 | 5/2013 | Gomes |
| 2013/0179991 A1 | 7/2013 | White et al. |
| 2013/0227641 A1 | 8/2013 | White et al. |
| 2013/0232573 A1 | 9/2013 | Saidi et al. |
| 2013/0268997 A1 | 10/2013 | Clancy, III et al. |
| 2013/0291056 A1 | 10/2013 | Gaudet et al. |
| 2014/0059357 A1 | 2/2014 | Andersson et al. |
| 2014/0075451 A1 | 3/2014 | Anderson et al. |
| 2014/0201807 A1 | 7/2014 | White et al. |
| 2014/0256251 A1 | 9/2014 | Caceres et al. |
| 2014/0273857 A1 | 9/2014 | White et al. |
| 2014/0282857 A1 | 9/2014 | White et al. |
| 2014/0282992 A1 | 9/2014 | Clancy, III et al. |
| 2014/0283136 A1 | 9/2014 | Dougherty et al. |

OTHER PUBLICATIONS

International Search Report and Written Opinion issued in International Applicaiton No. PCT/US2015/020492, mailed Jun. 25, 2015, 7 pages.

International Search Report and Written Opinion issued in International Application No. PCT/US14/33344, mailed Sep. 11, 2014. 12 pages.

* cited by examiner

SYSTEMS AND METHODS FOR RESTRICTING ACCESS TO NETWORK RESOURCES VIA IN-LOCATION ACCESS POINT PROTOCOL

CROSS-REFERENCE TO RELATED APPLICATIONS

This application is a non-provisional application of the following U.S. provisional applications, each of which is hereby incorporated by reference herein in its entirety: U.S. Provisional Application Ser. No. 61/693,427, filed Aug. 27, 2012; and U.S. Provisional Application Ser. No. 61/785,109, filed Mar. 14, 2013.

BACKGROUND

1. Field

The present invention relates to mobile device security and in particular to restricting access to network resources via an in-location access point protocol.

2. Description of the Related Art

Mobile devices, such as smartphones, tablets and other web-connected devices are proliferating, both for use as business tools and for personal use. Such mobile devices may provide a platform for collecting, storing, processing and communicating data. In many cases, such data may be personal and/or confidential, such as personal contacts, financial information, and business materials.

Consequent to the proliferation of mobile devices, mobile security is an increasing area of concern in the field of mobile computing. Software and data related security of current devices, especially mobile devices, rely on a variety of features including virtual machines, inter-process communication, package managers, mobile device management systems, touch screen software components, shared memory, relational databases, device configuration signature checking, specialized debugging interfaces (e.g. Android Debug Bridge, and the like), trusted daemon processes, and the like to protect the information on the mobile devices. In an example, Android mobile devices use checks on inter-process communication to determine if an application should gain access to a particular system resource, such as the user's contact list. Virtual machine security checks, such as determining whether or not a specific native library should be loaded, are also employed.

However, such security approaches do not account for the physical location of the mobile device. Therefore, there is a need for location-based security solutions. More particularly, there is a need for security solutions that track the mobile devices, if any, within a particular location and grant or restrict access to a network resource based on which mobile devices are in the particular location.

SUMMARY

As mobile devices, such as smartphones and tablet computers, become more powerful and ubiquitous, it becomes advantageous to use them for an increasing number of applications. In some instances, an additional element of security may be added based on the location of the device.

In embodiments, systems and methods for restricting access to network resources/web content based on location are provided. For example, the method includes communicating first, second, and third authentication data via short-range wireless signals between a mobile device and an in-location access point device, wherein the second authentication data from the mobile device is based on the first authentication data from the in-location access point device and the third authentication data from the in-location access point device is based on the second authentication data. Fourth authentication data is communicated between the mobile device and a web-based information system, wherein the fourth authentication data comprises at least a portion of at least one of the first, second, and third authentication data; and access to network accessible web content by the mobile device is authenticated with the web-based information system based on the validity of the fourth authentication data.

The short-range wireless signals may comprise one or more Bluetooth messages, such as Bluetooth heartbeat messages; one or more near-field communications signals, one or more Wi-Fi signals, or one or more high frequency sound signals. The first and second authentication data may comprise time data to limit the first and second authentication data's validity to specific time periods. Communicating the second authentication data may comprise applying one or more cryptographic operations to the second authentication data. Communicating the second authentication data may comprise periodic communication between the mobile device and the in-location access point device. The third authentication data may comprise one or more of cryptographic signatures, encrypted data, certificates, sensor data, mobile device data, and identity data. The fourth authentication data may comprise an HTTP GET/POST request. The method of claim 1, wherein The web-based information system may comprise one or more of a proxy, a gateway, a reverse proxy, a forwarding service, a firewall, a web server, a database and cache.

The method may further comprise communicating, by the web-based information system, configuration data to configure the mobile device, and may comprise communicating mobile device security data to configure security governing the mobile device.

In embodiments, a method for providing secure location-based remote access to web content is provided. The method includes transmitting a short-range wireless first authentication communication by an in-location access point device to a mobile device at a predetermined location; receiving a short-range wireless second authentication communication by the in-location access point device from the mobile device in response to the first authentication communication, wherein the second authentication communication ensures that the mobile device is in proximity to the in-location access point device; transmitting a short-range wireless third authentication communication by the in-location access point to the mobile device in response to the second authentication communication; receiving a fourth authentication communication by a web-based information system from a mobile device, wherein the fourth authentication communication comprises at least a portion of at least one of the first, second, and third authentication communications; and evaluating the fourth authentication communication by the web-based information system and allowing access to network accessible web content by the mobile device if the fourth authentication communication is valid and prohibiting access to the network accessible web content by the mobile device if the fourth authentication communication is not valid. The authentication data may be encrypted.

Also disclosed herein is a system for restricting access to web content. In embodiments, the system comprises a network; an access point device located in an environment, and configured to provide authentication data to a user computing device determined to be located in the environment; and a server configured to communicate with the user computing device via the network, to receive authentication communication including the authentication data from the user computing device, to evaluate the authentication data from the user computing device, to allow access to network accessible web content if the authentication data is valid and to prohibit access to web content by the user computing device if the authentication data is not valid.

In embodiments, an access point device for communicating with and authenticating a mobile device is disclosed. The access point device comprises: a short range communication module for periodically communicating with one or more mobile devices in proximity to the access point; and an authentication module for repeatedly exchanging authentication messages with the at least one mobile device, thereby maintaining continuous authentication of the at least one mobile device.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting, but rather to provide an understandable description of the invention.

A key challenge with web-based information systems that use protocols, such as HTTP, is that they cannot restrict access based on the physical location of the accessing client. Provided herein are systems and methods for restricting access to web-based information by a mobile device, such as a mobile phone or tablet, based on the physical location of the mobile device.

Systems and methods for restricting access to one or more network resources via an in-location access point protocol may include communicating between a mobile device and an in-location access point device to establish that the mobile device has entered a location and then using authentication data obtained from or communicated to the in-location access point device in order to obtain access to a resource, such as a web resource. For example, the mobile device may receive first authentication data via near-field communication from an in-location access point device, send second authentication data to the in-location access point device via Bluetooth messages, such as Bluetooth heartbeat messages, receive third authentication data as responses to the Bluetooth messages, send HTTP requests to a web proxy or server that include the third authentication data (e.g. such as in HTTP headers), and receive access to one or more web pages if the proxy or server determines that the third authentication data is consistent with the mobile device being within the location.

Figure 1:
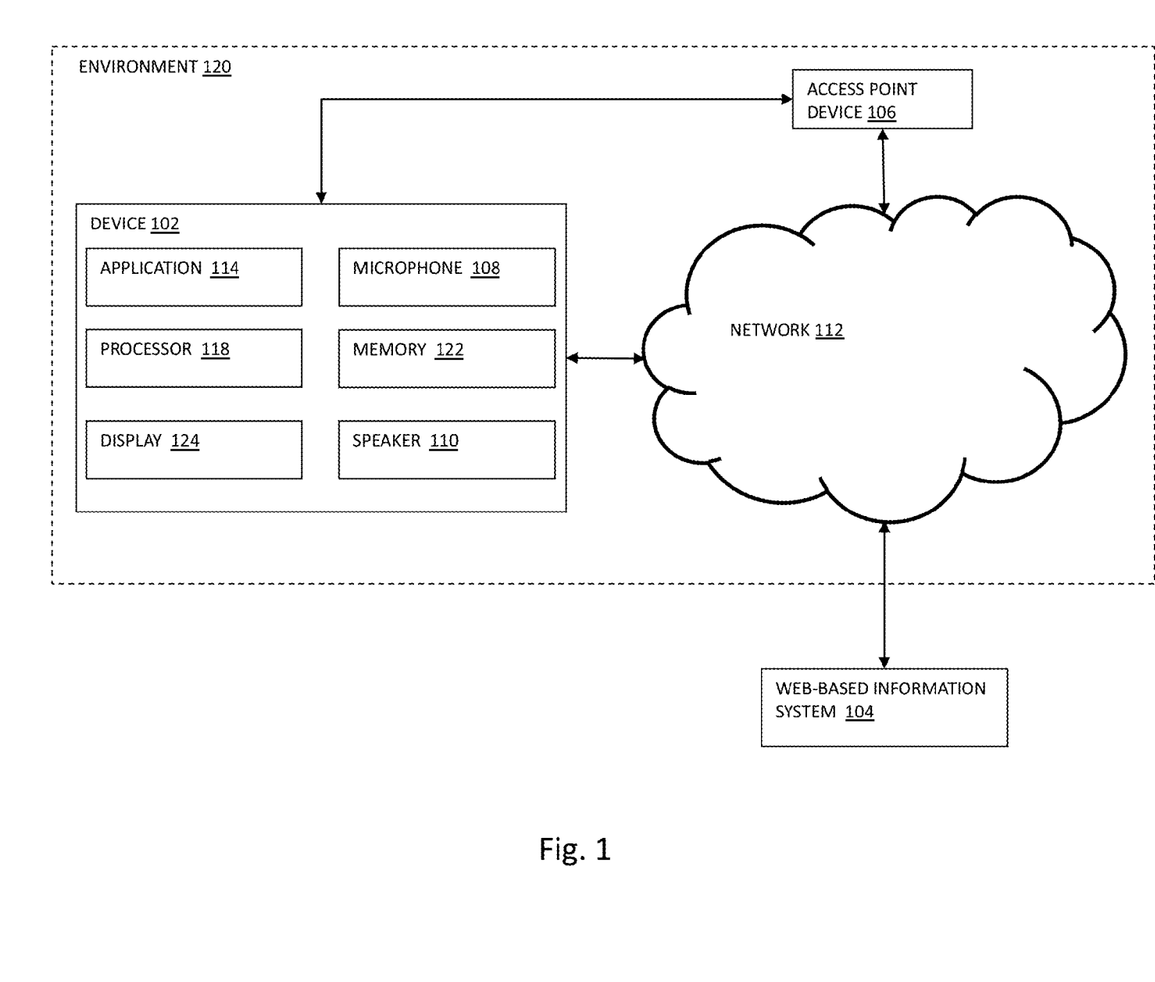
FIG. 1 depicts certain components of an exemplary system that may be utilized in providing a secure device.

Referring to FIG. 1, when a device 102 enters an environment 120 recognized by the web-based information system 104, the device 102 may receive first authentication data from an in-location access point device 106. The first authentication data may be received over a first short-range communication channel, such as high frequency sound, near field communication, Bluetooth, via a network 112 (e.g. a Wi-Fi network), or another short-range communication channel. In embodiments, where the authentication data may be received by the device 102 as a high frequency sound, such high frequency sound may be received by a microphone 108 of the device 102. The network 112 may be one or more of a wireless network, a wired network, a LAN, a WAN, a MAN or some other network.

In embodiments, the device 102 may be a cellular phone, such as an iPhone, a Motorola Droid Razr Maxx, a HTC One X, a Samsung Focus 2, a Samsung Gusto 2, or some other cellular phone. In some embodiments, the device 102 may be a tablet, such as an iPad, an Asus Eee Pad Transformer Prime, a Sony Tablet S, a Samsung Galaxy Tab 10.1, or some other tablet. The device 102 may comprise a processor 118, a memory 122 and a display 124. The device 102 may further include a speaker 110, and one or more applications 114.

The in-location access point device 106 may be enabled to send and/or receive an electronic message, such as an electronic heartbeat message. Such heartbeat message may utilize one or more protocols, such as, but not limited to Wi-Fi, Bluetooth, Bluetooth LE, ultrasonic sound, Zigbee and the like. For example, in some embodiments, the in-location access point device 106 may be enabled to communicate with the device 102 via the wireless network 112. In embodiments, the in-location access point device 106 may be enabled to receive presence information, such as a high frequency sound created by the device 102. In some embodiments, the in-location access point device 106 may be a transmitter enabled to send presence information, such as a high frequency sound to be received by the device 102. In embodiments, the in-location access point device 106 may be a plurality of in-location access point devices. In such embodiments, each in-location access point device 106 may broadcast its own unique identifier, so that the location of a device 102 within the environment 120 may more specifically be determined. The in-location access point device 106 may be enabled to track unique sounds emitted by an enabled device 102, for example, to distinguish individual devices among a plurality of devices.

The in-location access point device 106 may be connected to the web-based information system 104 via the wireless network 112. The in-location access point device 106 may provide updates to the web-based information system 104 regarding the data from the device 102 received by the in-location access point device 106. For example, if the in-location access point device 106 has not received data from a device 102 within a certain period of time (for example, 30 minutes), the in-location access point device 106 may signal to the web-based information system 104 that the device 102 is no longer within the environment 120.

Once the device 102 receives the first authentication data, the device 102 may optionally set up a periodic heartbeat over a second short-range communication channel, which may be the same as the first short range communication channel, to continually prove that the device 102 is in the environment 120. For example, if the device 102 received the first authentication data as a high frequency sound via the microphone 108, the device 102 may communicate the second authentication data as a high frequency sound via speaker 110 to the access point device 106. In another example, if the device 102 received the first authentication data via a Wi-Fi network 112, the device 102 may communicate the second authentication data via the same network 112. In some embodiments, the periodic heartbeat may have an irregular or non-deterministic period. Each heartbeat message sent from the device 102 may send second authentication data, which can include, but is not limited to, one or more of the first authentication data, mobile device certificate, hashes, user certificate, time, device-specific cryptographic material, web information system cryptographic material, device sensor data (including audio/video), device RF data, data obtained from a short-range communication channel, device hardware cryptographic materials or capabilities (e.g. CAC card, hardware cryptographic processors, etc.), user passwords/pins, other data on the device to prove the identity, location, time, user, environment, web-based information, web-based addressing information (e.g. URLs) or other aspects of the device 102 to the in-location access point device 106.

Instead of a heartbeat, in some embodiments the device 102 may setup a request-based communication system where the device 102 sends messages, which may or may not be over a persistent connection that endures past the request/response cycle, to send second authentication data to the in-location access point device 106.

In embodiments, the second authentication data may also optionally have additional cryptographic operations, such as hashes, applied before sending it to the in-location access point device 106 and on reception at the in-location access point device 106 to verify validity.

In additional embodiments, the in-location access point device 106 may compare sensor data or other measurements (e.g. sound/RF frequencies in use, light levels, etc.) to validate authentication data. In some embodiments, both the first and second authentication data may have a time component that restricts the authentication data's validity to specific time periods.

The in-location access point device 106 may send third authentication data to the device 102 in response to the in-location access point device 106 receiving and validating the second authentication data from the device 102. The third authentication data may include, but it is not limited to, cryptographic signatures, encrypted data, certificates, sensor data, mobile device data, identity data, or other information. The third authentication data may contain information needed to access the web-based information system 104. In some embodiments, the in-location access point device 106 may send one or more messages to the web-based information system 104 to notify it of one or more of the device 102, first authentication data, second authentication data, third authentication data, or portions of the first, second, or third authentication data.

The web-based information system 104 may receive the aforementioned messages at a proxy, gateway, reverse proxy, forwarding service, firewall, web server, database, cache, or any other web-based information system that may be enabled to block or deny access to web-based data, change web-based data returned to a device 102, change addressing of web-based data, persist web-based data, or provide the raw data used to generate web-based data.

The device 102 may send a request, such as an HTTP GET/POST request, for web-based information. In embodiments, such request may include fourth authentication data composed of all or combinations of portions of the first, second, or third authentication data. The device 102 may send the request over an encrypted channel, such as TLS (transport layer security) that includes additional request authentication data, such as a TLS client auth certificate, which can be validated by the web-based information system 104 as matching some component of the first, second, or third authentication data. The fourth authentication data may be sent to the web-based information system 104 as part of a web information request, such as, but not limited to, through a HTTP header, URL parameter, client option, TLS client certificate, or post parameter. On receipt of the optional fourth authentication data, the web-based information system 104 may adapt access controls, addressing, caching, or any other aspect of web information access and delivery based on the determined location, identity, or a combination thereof of the device 102, user of the device 102, or the environment 120.

In embodiments, the web-based information system 104 may optionally return configuration data to the device 102 that is used to govern security of the web information (e.g. caching, password requirements, etc.), configure future requests, optimize requests, obtain access to additional networks, update room access point device information, etc. The first, second, third, and fourth authentication data may be used by the device 102 to configure an application 114. An application 114 may be a web browser, a display system, a networking layer, a storage system for web information, a network routing information, a database, other applications on the device, or other systems involved, or potentially involved, in storing, accessing, processing, or displaying the web information.

Figure 2:
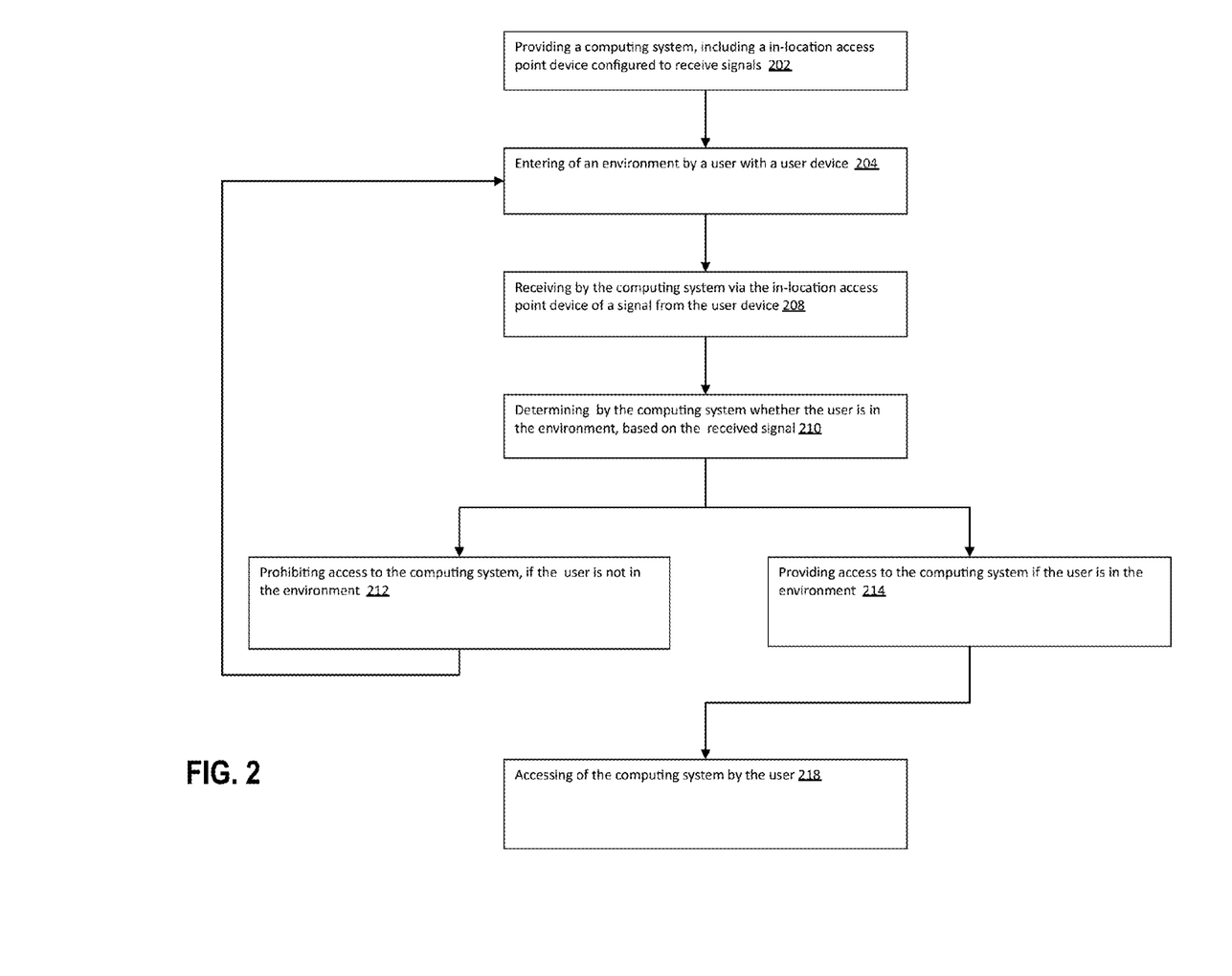
FIG. 2 depicts an exemplary workflow for securing a computing system based on the presence of users in a location.

Referring now to FIG. 2, methods for securing a computing system based on the presence of one or more users in a location may comprise providing a computing system, including a fixed in-location access point device configured to receive signals at a step 202; entering of an environment by a user with a user device at a step 204; receiving by the computing system via the in-location access point device of a signal from the user device at a step 208; determining by the computing system whether the user is in the environment, based on the received signal at a step 210; providing access to the computing system if the user is in the environment at a step 214; and accessing of the computing system by the user at a step 218.

Figure 3:
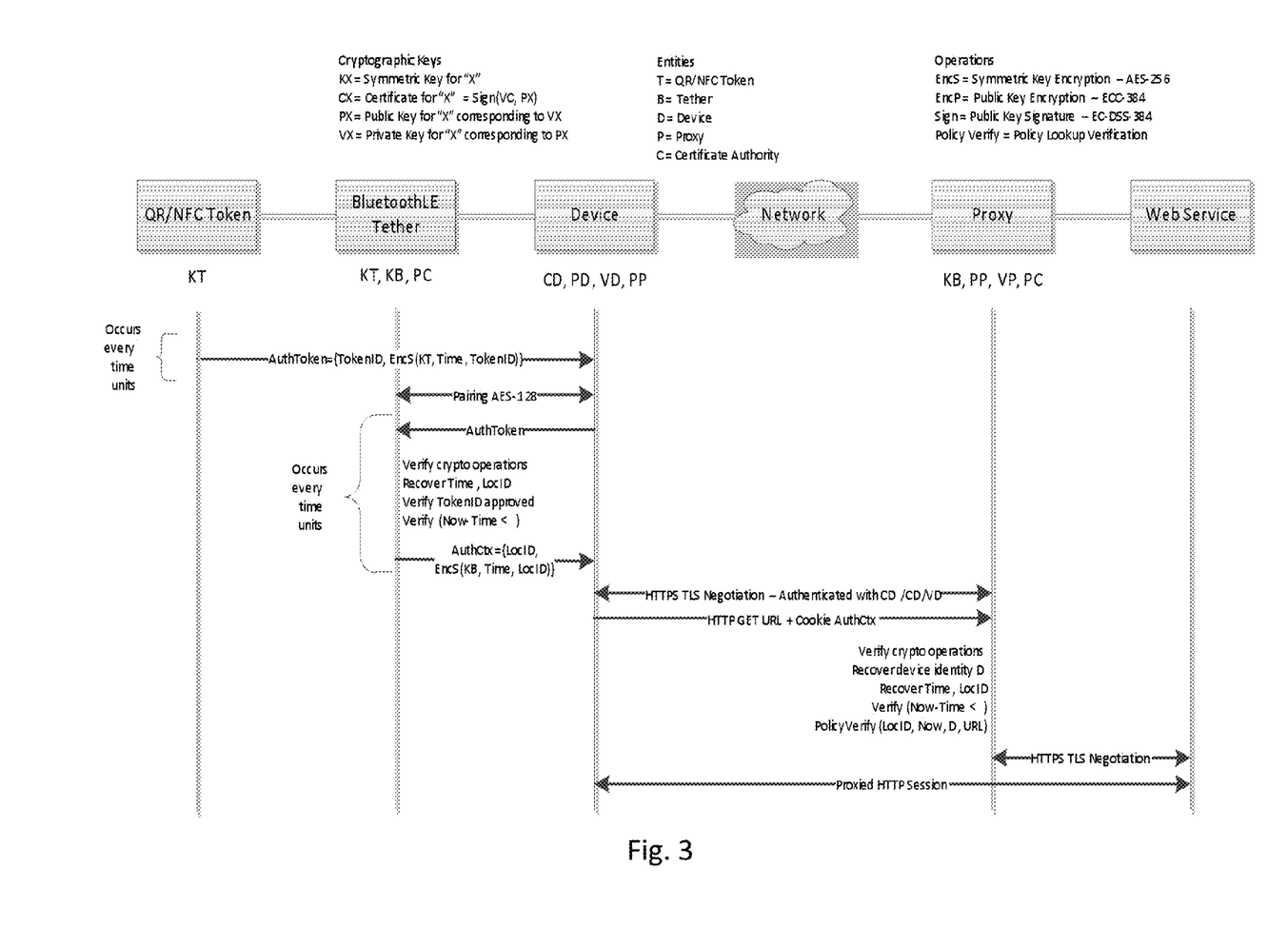
FIG. 3 depicts an exemplary protocol for in-location access restriction of web content by a mobile device.

An example of the above referenced in-location access restriction protocol is presented in FIG. 3 with respect to QR/NFC (Quick Response/Near Field Communication) Token generation and Token authentication.

QR/NFC Token generation may include the following operation (as communication between the access point device and mobile device):

AuthToken={ TokenID, EncS (KT, {Time, TokenID, 0x00 [128] })}

| Item | Type | Description |
|---|---|---|
| TokenID | uint_64 | Unique 64-bit identifier for the NFC token generator; each token generation device has a unique identifier, perhaps based on the device's |

-continued

| Item | Type | Description |
|---|---|---|
| | | MAC address (48-bit MAC address padded with zeros) |
| KT | uint_64[4] | 256-bit binary value representing the uniquely-provisioned key associated with token generator with identification TokenID |
| Time | uint_64 | Unix timestamp, representing the number of seconds elapsed since Jan. 1, 1970 |
| 0x00[128] | uint_64[2] | 128-bit binary value of all zeros |

QR/NFC Token generation may include the following operation:
1. Concatenate Time, TokenID, and 0x00[128] to form a 256-bit binary vector X;
2. Encrypt vector X with key KT using single iteration of AES-256 cipher to obtain Y; and
3. AuthToken is the 320-bit concatenation of TokenID and Y BluetoothLE Tether pairing as depicted in FIG. 3 may include unauthenticated but encrypted pairing between the device and BluetoothLE node with AES-CCM-128 encryption mode. Encryption via Bluetooth-layer crypto is optional.

Verification operations by the Tether system include receiving 320-bit AuthToken from the mobile device and the following nine exemplary steps.
1. Parse the 320-bit AuthToken into the TokenID and encrypted payload Y
2. Use TokenID to lookup KT in a local database
3. Use KT to decrypt Y using a single iteration of AES-256 cipher to obtain X
4. Parse X to obtain "Time", "TokenID", and "0x00[128]"
5. Verify that the decrypted TokenID matches the TokenID obtained in Step 2
6. Verify that 0x00[128] is indeed 128 bits of zero
   a. (Note that steps 6 and 7 ensure proper decryption of the payload to avoid spoofing attacks)
7. Verify that (Now-Time)<, where is time required between NFC swipes
   a. Suggest setting to 4 hours (14,400 seconds) for initial demonstrations, but ultimately configurable by the end user of the system
8. If any verification steps fail, then respond with an error message to the device
9. Otherwise, generate the authenticated context, AuthCtx Authenticated context may be provided via the following exemplary function and description of function items.
AuthCtx={ LocID, EncS (KB, {Time, LocID, 0x00[128] })}

| Item | Type | Description |
|---|---|---|
| LocID | uint_64 | Unique 64-bit identifier for the tether; each tether device has a unique identifier, perhaps based on the device's MAC address (48-bit MAC address padded with zeros) |
| KB | uint_64[4] | 256-bit binary value representing the uniquely-provisioned key associated with the tether with identification LocID |
| Time | uint_64 | Unix timestamp, representing the number of seconds elapsed since Jan. 1, 1970 |
| 0x00[128] | uint_64[2] | 128-bit binary value of all zeros |

The authenticated context function may comprise the following operational steps:
1. Concatenate Time, LocID, and 0x00[128] to form a 256-bit binary vector X 2. Encrypt vector X with key KB using single iteration of AES-256 cipher to obtain Y
3. AuthCtx is the 320-bit concatenation of LocID and Y Connection to the Proxy as depicted in FIG. 3 may support using ECC ciphersuites for TLS for Suite-B compliance.

An example embodiment for achieving FIPS 140-2 based on the device and proxy both having 2048-bit RSA certificate provisioned by and originated from the same certificate authority is as follows.

The following functions may be used to create a certificate authority certificate:
mkdir -p demoCA/private
touch demoCA/index.txt
echo 00>demoCA/serial
openssl req -new -nodes -x509 -newkey rsa:2048 -days 1825 -extensions v3_ca -keyout demoCA/private/cakey.pem -out demoCA/cacert.pem The following functions may be used to create the proxy key and certificate:
openssl req -newkey rsa:2048 -nodes -keyout proxykey.pem -out proxyreq.pem
openssl ca -days 365 -outdir . -out proxycert.crt -infiles proxyreq.pem For the field "Common Name (e.g. YOUR name)" one may list the DNS hostname for the proxy. The following functions may be used to create the mobile device key and certificate for device "X":
openssl req -newkey rsa:2048 -nodes -keyout dev_X_key.pem -out dev_X_req.pem
openssl ca -days 365 -outdir . -out dev_X_cert.crt -infiles dev_X_req.pem In an example, cacert.pem may be loaded on the proxy and each device as the certificate authority (CA) certificate, and proxycert.crt and proxykey.pem for certificate and private key. This procedure facilitates using standard HTTPS/TLS to secure the proxy connection.

For each HTTP GET/POST operation that occurs via the proxy, the device browser may set the HTTP cookie associated with the authenticated context. An exemplary HTTP/1.1 format for this is:
Cookie: AuthenticatedContext=[AuthCtx], wherein [AuthCtx] is the 320-bit value for the authenticated context.

For context verification, the HTTP proxy may inspect the AuthenticatedContext cookie prior to forwarding it on to the web service. In some embodiments, it may be preferable to pass the cookie on to the web service, as the web service may also be context-aware and able to verify to provide further policy granularity.

The following nine-step operation may be used, as a non-limiting example, to verify AuthCtx:
1. Parse the 320-bit AuthCtx into the LocID and encrypted payload Y;
2. Use LocID to lookup KB in a local database;
3. Use KB to decrypt Y using a single iteration of AES-256 cipher to obtain X;
4. Parse X to obtain "Time", "LocID", and "0x00[128]";
5. Verify that the decrypted LocID matches the LocID obtained in Step 2;
6. Verify that 0x00[128] is indeed 128 bits of zero;
   a. (Note that steps 6 and 7 ensure proper decryption of the payload to avoid spoofing attacks)
7. Verify that (Now-Time)<, where is time required between tether heartbeats;
   a. Suggest setting to 5 seconds for initial demonstrations, but ultimately configurable by the end user of the system 8. If any verification steps fail, then respond with an error message to the device; and
9. Otherwise, proxy the HTTP query per the device configuration User identity verification may be provided by the web service via username/password-based authentication to verify the user's identity.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like.

The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method of restricting access to web content based on location, the method comprising:
    communicating first, second, and third authentication data via short-range wireless signals between a mobile device and an in-location access point device, wherein at least a portion of the second authentication data sent from the mobile device is a first cryptographic transformation of at least a portion of the first authentication data sent from the in-location access point device and at least a portion of the third authentication data sent from the in-location access point device is a second cryptographic transformation of at least a portion of the second authentication data, wherein the second authentication data ensures that the mobile device is within proximity to the in-location access point device;
    communicating a fourth authentication data between the mobile device and a web-based information system, wherein the fourth authentication data comprises at least a portion of the third authentication data;
    authenticating access to network accessible web content by the mobile device with the web-based information system based on the validity of the fourth authentication data, wherein validity is determined based on whether the fourth authentication data is evidence of the physical presence of the mobile device in the location in which the in-location access point device is located;
    wherein communicating the first, second, third, and fourth authentication data and authenticating access to network accessible web content are performed repeatedly to maintain the continuous evidence of physical presence and at least one of the method steps is implemented by a hardware processor.

2. The method of claim 1, wherein the short-range wireless signals comprise one or more Bluetooth messages.

3. The method of claim 1, wherein the short-range wireless signals comprise one or more near-field communications signals.

4. The method of claim 1, wherein the short-range wireless signals comprise one or more Wi-Fi signals.

5. The method of claim 1, wherein the short-range wireless signals comprise one or more high frequency sound signals.

6. The method of claim 1, wherein the first and second authentication data comprise time data to limit the first and second authentication data's validity to specific time periods.

7. The method of claim 1, wherein the short-range wireless signals comprise Bluetooth LE signals.

8. The method of claim 1, wherein communicating the first, second, third, and fourth authentication data is repeated at a regular time interval.

9. The method of claim 1, wherein the third authentication data comprises one or more of cryptographic signatures, encrypted data, certificates, sensor data, mobile device data, and identity data.

10. The method of claim 1, wherein the fourth authentication data further comprises an HTTP GET/POST request.

11. The method of claim 1, wherein the web-based information system comprises one or more of a proxy, a gateway, a reverse proxy, a forwarding service, a firewall, a web server, a database and cache.

12. The method of claim 1, wherein the method further comprises communicating, by the web-based information system, configuration data to configure the mobile device.

13. The method of claim 12, wherein communicating configuration data to configure the mobile device comprises communicating mobile device security data to configure security governing the mobile device.

14. A method for providing secure location-based remote access to web content, the method comprising:
    transmitting a short-range wireless first authentication communication by an in-location access point device to a mobile device at a predetermined location;
    receiving a short-range wireless second authentication communication by the in-location access point device from the mobile device in response to the first authentication communication, wherein the second authentication communication ensures that the mobile device is within proximity to the in-location access point device by verifying that at least a portion of the second authentication communication is a first cryptographic transformation of at least a portion of the first authentication communication;

transmitting a short-range wireless third authentication communication by the in-location access point to the mobile device in response to the second authentication communication, wherein at least a portion of the third authentication communication is a second cryptographic transformation of at least a portion of the second authentication communication;

receiving a fourth authentication communication by a web-based information system from a mobile device, wherein the fourth authentication communication comprises at least a portion of the first, second, and third authentication communications; and evaluating the fourth authentication communication by the web-based information system and allowing access to network accessible web content by the mobile device if the fourth authentication communication is valid and prohibiting access to the network accessible web content by the mobile device if the fourth authentication communication is not valid, wherein validity is determined based on whether the fourth authentication data is evidence of the physical presence of the mobile device in the location in which the in-location access point device is located;

wherein receiving a fourth authentication communication and evaluating the fourth authentication communication is performed repeatedly to maintain continuous evidence of physical presence and at least one of the method steps is implemented by a hardware processor.

15. The method of claim 14, wherein the short-range wireless communication comprises at least one of a Bluetooth message, a near-field communications signal, a Wi-Fi signal, and a high frequency sound signal.

16. The method of claim 14, wherein the validity of the authentication data is limited to a predetermined time period.

17. The method of claim 14, wherein the short-range wireless communication comprises a Bluetooth LE signal.

* * * * *